Figure 1:
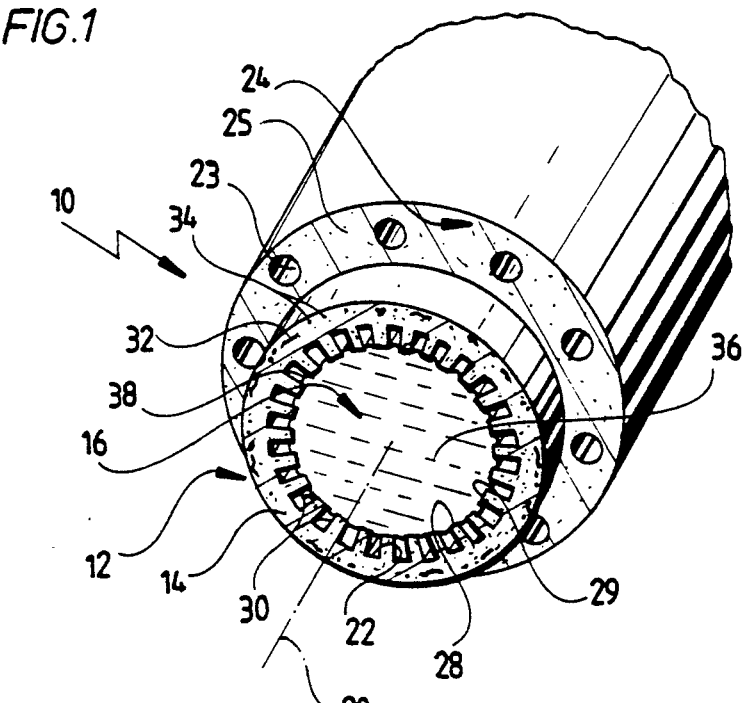

United States Patent [19]

Lindner et al.

[11] Patent Number: 5,088,548
[45] Date of Patent: Feb. 18, 1992

[54] HEAT ACCUMULATOR WITH EXPANSION RECESSES

[75] Inventors: Friedrich Lindner, Leinfelden-Echterdingen; Hans-Joerg Staehle, Filderstadt; Peter Tattermusch, Altdorf, all of Fed. Rep. of Germany

[73] Assignee: Deutsche Forschungsanstalt fuer Luft- und Raumfahrt e.V., Fed. Rep. of Germany

[21] Appl. No.: 598,619

[22] PCT Filed: Feb. 16, 1990

[86] PCT No.: PCT/EP90/00250

§ 371 Date: Dec. 7, 1990

§ 102(e) Date: Dec. 7, 1990

[87] PCT Pub. No.: WO90/10187

PCT Pub. Date: Sep. 7, 1990

[30] Foreign Application Priority Data

Feb. 24, 1989 [DE] Fed. Rep. of Germany ....... 3905706

[51] Int. Cl.$^5$ ................................................ F28D 20/00
[52] U.S. Cl. .......................................... 165/10; 165/917
[58] Field of Search ................................. 165/10, 917

[56] References Cited

U.S. PATENT DOCUMENTS 4,509,590  4/1985  Svetlila .................. 165/917
4,693,338  9/1987  Jensen et al. .
4,993,481  2/1991  Kamimoto et al. ................ 165/10

FOREIGN PATENT DOCUMENTS 2919250  5/1980  Fed. Rep. of Germany .
2084311  4/1982  United Kingdom .............. 165/10
2127330  4/1984  United Kingdom .
00212    1/1985  World Int. Prop. O. .

OTHER PUBLICATIONS

Patent Abstracts of Japan, vol. 13, No. 526 (M-897) (3874), Nov. 22, 1989; & JP A 1212983 (Agency of Ind. Science & Technol.) Aug. 25, 1989.

Primary Examiner—Albert W. Davis, Jr.
Attorney, Agent, or Firm—Barry R. Lipsitz

[57] ABSTRACT

To improve a storage heater, which comprises a storage container with a wall region for the introduction of heat and a storage medium arranged in this storage container, in order to maximize the service life and to enable it to withstand a plurality of melting and solidifying processes, the wall region is provided with recesses opening out towards the storage medium, a wall surface of the region of the wall facing the storage medium is made of a material that is not wetted by the storage medium and the facing wall surfaces in the recesses are at a distance apart such that the storage medium does not enter them in the completely liquid state due to capillarity.

25 Claims, 3 Drawing Sheets

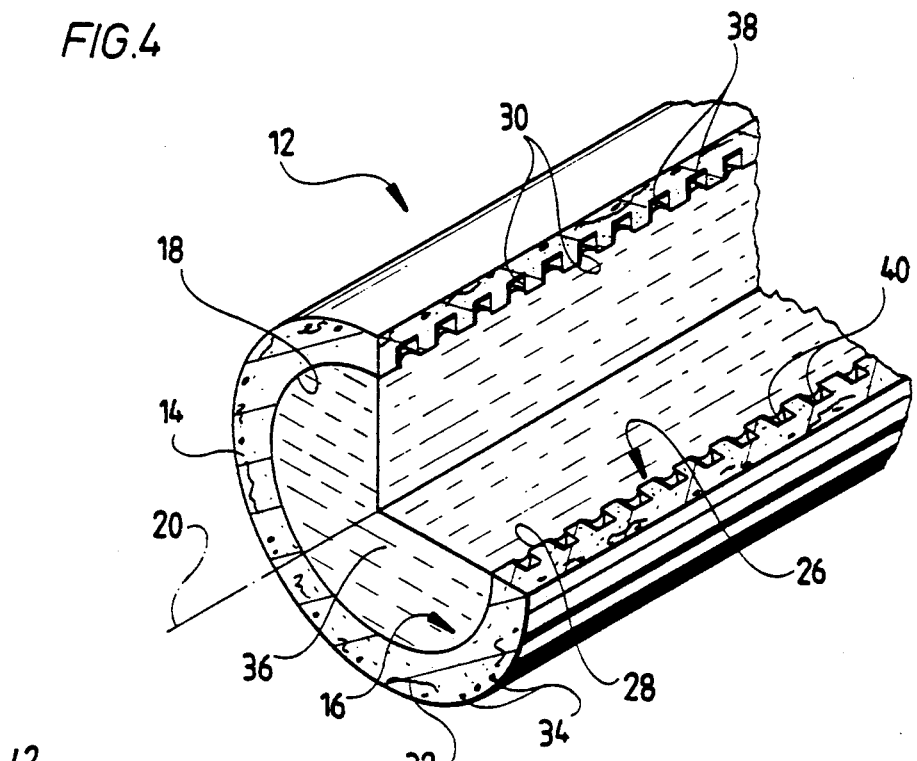
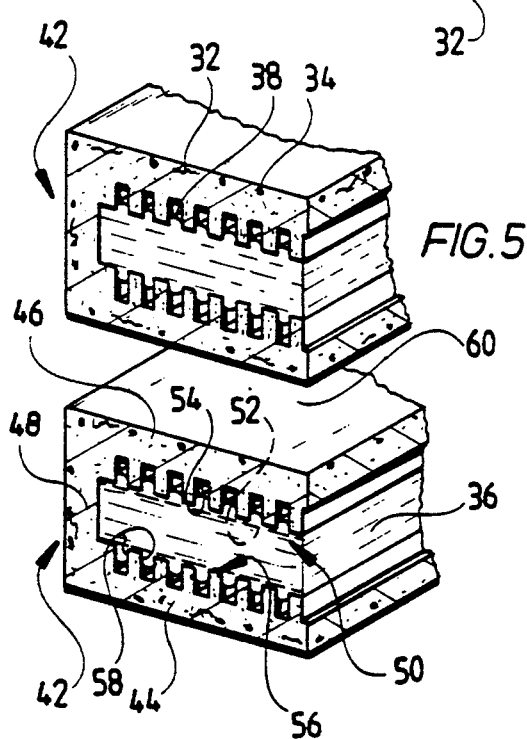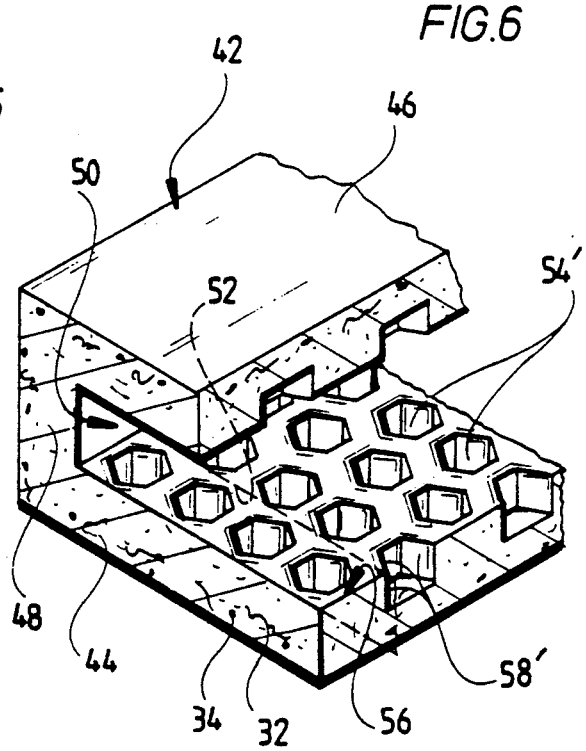

HEAT ACCUMULATOR WITH EXPANSION RECESSES

The invention relates to a heat accumulator comprising a storage container with a wall region provided for the introduction of heat and a storage medium arranged in this storage container.

On account of their high melting heat, alkali fluorides or alkaline-earth fluorides or their eutectics are, for example, very well suited for storing heat at high temperatures. High-alloy steels or high-purity nickel are used to encapsulate this storage medium in order to reduce the corrosion and ensure sufficient stability of the storage container at the high temperatures.

The encapsulation of the storage medium in such storage containers is very problematic as this storage medium undergoes great changes in volume of the order of magnitude of 20 to 30% during the melting or solidifying process, with the completely molten storage medium exhibiting a volume which is 20 to 30% larger than that of the solidified storage medium. The volume contraction during the solidification of the storage medium results in the formation of cavities (contraction cavities) in the interior of the storage medium.

These changes in volume cause problems during the melting process as the storage medium starts to melt in its region facing the walls of the storage container during the heating of the heat accumulator and the molten storage medium then exhibits a volume which is approximately 30% larger. However, so long as still solidified storage medium remains firm in the storage container, the molten storage medium must be provided with additional volume if it is not to deform the storage container because the contraction cavities are initially unable to compensate the increase in volume. In the hitherto known storage containers, it was not possible to provide the molten storage medium with additional volume. The storage container had to be so stable that the molten storage medium was able to displace the still solidified storage medium in order to create the necessary volume for itself. Attempts were made to remedy the situation by heat conducting plates being inserted in the interior of the storage container. However, owing to the changes in volume of the storage medium, these became deformed in a uncontrolled manner.

In addition, the mechanical stability of the storage container was impaired by the occurrence of corrosion problems, in particular, at the weld seams.

The object underlying the invention is, therefore, to so improve a heat accumulator of the generic kind that it has as long a service life as possible and, in particular, withstands a plurality of melting and solidifying processes.

This object is accomplished in accordance with the invention in that the wall region is provided with recesses which are open towards the storage medium, in that a wall surface of the wall region facing the storage medium is made of a material which is not wettable by the storage medium, and in that facing wall surfaces in the recesses exhibit such a spacing from one another that the storage medium does not penetrate into these to any substantial degree in the completely liquid state owing to the capillary forces.

The advantage of the inventive solution is to be seen in that all kinds of corrosion damage are prevented by the wall surface being made of a material which is not wettable by the storage medium and, in addition, the recesses create additional volume which the storage medium does not penetrate to any considerable degree in the completely liquid state and hence does also not penetrate in the solidified state, but it can penetrate into these against the action of the capillary forces when in the course of the melting process, the molten portion of the storage medium is under increased pressure owing to the increase in volume, and so the storage container is not subjected to increased pressure forces. Once a sufficiently large portion of the storage medium has then melted, it will have the possibility of penetrating into the cavities created during the solidification process owing to the volume contraction in the interior of the storage medium, and so a pressure relief occurs and, finally, in the completely liquid state there are no more additional forces present on account of which the storage medium will penetrate into the recesses against the action of the capillary forces, In a subsequent solidifying process, the storage medium will then, in turn, solidify without penetrating into the recesses, and so during the subsequent melting process, the volume of the recesses will again be available for accommodating the molten portion of the storage medium. Such a heat accumulator can be used with particular advantage in space travel.

To ensure that the heat accumulator is resistant to its environment, in particular, air and/or is gas-tight, provision is made for outside surfaces of the heat accumulator to be coated with one or several protective layers of metal and/or ceramics. In this context, outside surfaces are to be understood as surfaces not facing the storage medium.

In particular, a storage medium which does not react chemically with the material of the wall surfaces results in an advantageous embodiment of the inventive heat accumulator as the latter exhibits a very high long-term stability.

An advantageous storage medium is aluminum.

Preferred storage media are also salts and salt hydrates or eutectics comprising these.

As mentioned at the beginning, owing to the high melting heat, alkali halides and alkaline-earth halides or eutectics comprising these offer great advantages as storage medium, and their high capability of reacting does not result in corrosion owing to the non-wettable wall surfaces.

It has proven particularly expedient for the facing wall surfaces of the recesses to extend substantially transversely to a surface of the storage medium extending between the wall surfaces as this then creates in a particularly favorable way the possibility for the storage medium which increases its volume during the melting to find additional volume in the recesses.

The dimensions of the recesses are preferably chosen such that the recesses exhibit in at least one direction a spacing of the wall surfaces which is less than approximately 6 mm. Such dimensions are fully adequate, above all, when the storage medium is not subjected to any gravitational forces. It is even more advantageous for the spacing of the wall surfaces to be less than approximately 4 mm. Optimal values are obtained with spacings between the wall surfaces of less than approximately 2 mm, preferably less than approximately 1 mm. The last-mentioned values are of significance, particularly with the occurrence of gravitational forces acting on the storage medium as the capillary forces then have to be large enough to also counteract these.

In the above-described embodiments, no further details were given as to the type of the cross-section of the recesses. It is conceivable for the recesses to have a rectangular or U-shaped cross-section. It is, however, particularly advantageous for the recesses to be provided with wall surfaces which widen conically towards the storage medium so, for example, in the case of recesses in the form of grooves, these have a V-shaped cross-section.

In the embodiments described so far of the inventive heat accumulator, no further details were given as to the properties of the material which is not wettable by the storage medium. A solution wherein the wall surface facing the storage medium comprises graphite has proven particularly suitable. It is even better with respect to the resistance to corrosion for the wall surface facing the storage medium to be made of graphite. To achieve better heat conductivity of the wall of the storage container, provision is made for metals to be embedded in a wall of the storage container carrying the wall surface. These are preferably embedded metal splinters.

It is, furthermore, advantageous for ceramic fibers to be embedded in a wall carrying the wall surface. These serve to improve the mechanical stability and resistance of the wall and hence of the storage container.

Aside from the fact that the wall surfaces preferably comprise graphite or are made of graphite, it is, furthermore, possible for the wall of the storage container to also comprise graphite.

As an alternative to graphite as material which is not wettable by the storage medium, it is similarly conceivable for the wall surfaces to comprise carbon fibers and it is even more advantageous for the wall surfaces to be made of carbon fibers.

It is, furthermore, likewise conceivable for a wall of the storage container carrying the wall surface to comprise carbon fibers which simultaneously serve to stabilize it.

In the embodiments described so far, no further details were given as to the extent to which an interior space of the storage container is to be filled in the optimal case. It is, in principle, possible to fill the interior space of the storage container only partly. A solution is, however, particularly advantageous wherein an interior space of the storage container is substantially filled with the exception of the recesses with storage medium in the liquid state so that, on the one hand, optimal use is made of the interior space for storing as large a quantity of heat as possible, and, on the other hand, the storage medium always has the possibility during the melting process of using the recesses for the increase in volume. Above all, in order to achieve a thermal coupling of the storage medium with the storage container which is as optimal as possible, it is particularly expedient for the interior space of the storage container to be filled to the extent that the storage medium penetrates slightly into the recesses in the completely liquid state.

In the embodiments described so far, no further details were given as to the design of the recesses. A preferred embodiment makes provision for the wall region to comprise grooves which may be longitudinal, helical or annular grooves.

As an alternative to this, it is similarly conceivable for the wall region to comprise non-coherent recesses arranged alongside one another. These may, for example, be of cylindrical, rectangular or honeycomb design.

It is, however, not necessary for the recesses to be produced mechanically in a defined manner. It is similarly conceivable for the wall region to be provided with porous material not wettable by the storage medium, whereby the possibility is likewise created for the storage medium to penetrate into the porous material during the melting process, but withdraws therefrom again in the completely liquid state.

One possibility of providing such a porous material not wettable by the storage medium is the use of non-woven fabrics, for example, non-woven carbon fabric. A further possibility of providing such is the use of woven fabrics or knitted fabrics.

As an alternative to this, it is, however, also possible for the porous material to be open-pored, foamed material which is not wettable by the storage medium, the foamed material preferably being graphite foam.

Figure 2:
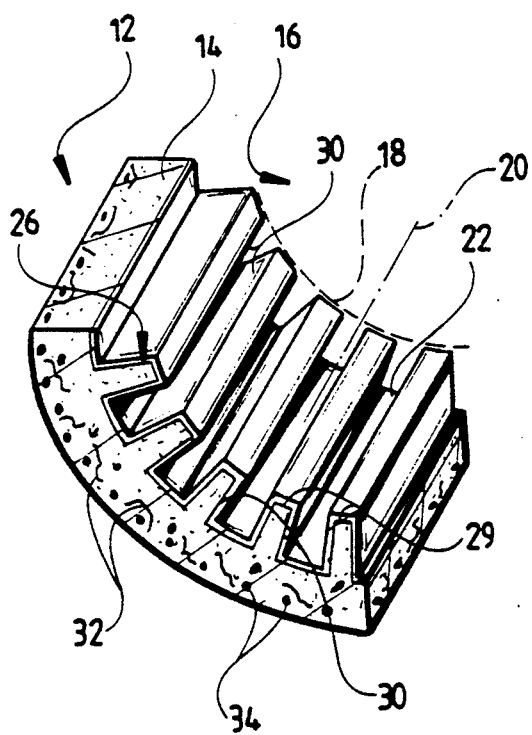
Figure 3:
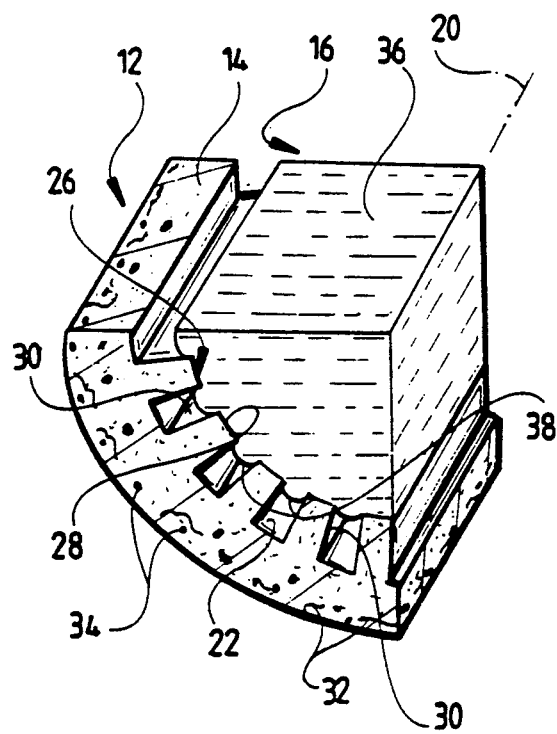
Figure 7:
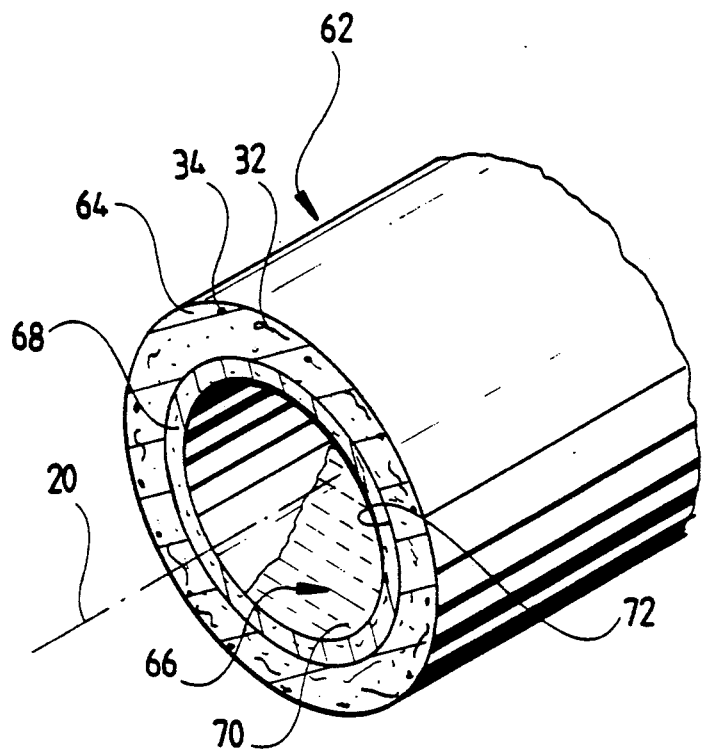
Figure 8:
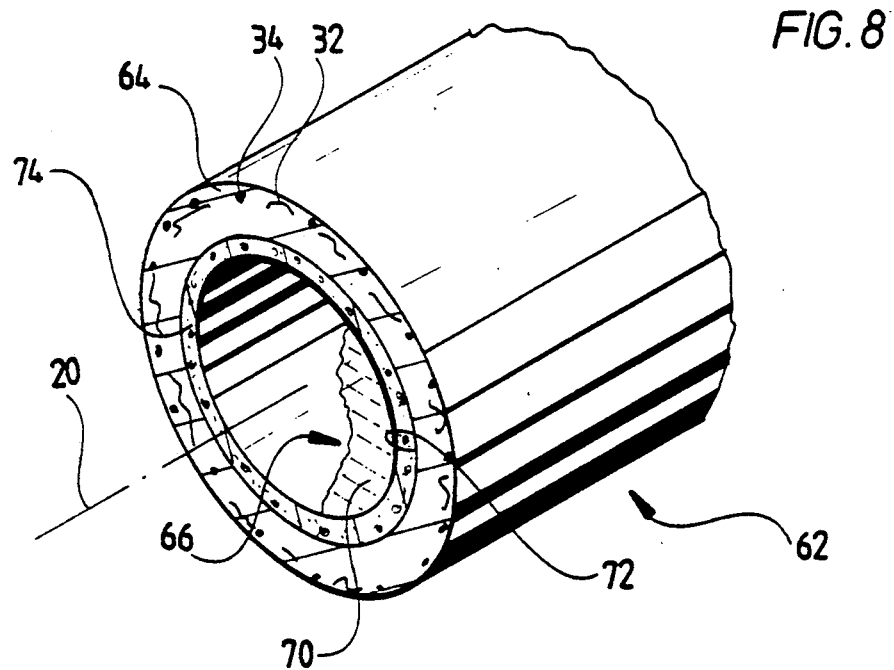

Further features and advantages are the subject matter of the following description and the drawings of several embodiments. The drawings show:

FIG. 1 a perspective illustration in section of a first embodiment of an inventive heat accumulator;

FIG. 2 an enlarged detail from FIG. 1 without storage medium;

FIG. 3 the enlarged detail according to FIG. 2 with storage medium;

FIG. 4 a perspective, cut-open illustration of a second embodiment of the inventive heat accumulator;

FIG. 5 a partly perspective illustration of a third embodiment of the inventive heat accumulator;

FIG. 6 an illustration similar to FIG. 5 of a fourth embodiment;

FIG. 7 an illustration similar to FIG. 1 of a fifth embodiment of the inventive heat accumulator; and FIG. 8 an illustration similar to FIG. 7 of a sixth embodiment of the inventive heat accumulator.

A first embodiment of an inventive heat accumulator designated in its entirety 10 comprises a cylindrical storage pipe 12 serving as storage container. Its wall 14 surrounds an interior space 16 comprising a cylindrical subspace 18 and longitudinal grooves 22 extending from the latter in the radial direction in relation to an axis 20 of the storage pipe 12 into the wall and also extending in the direction of the axis 20.

Heat is either fed to or removed from the storage pipe 12 as a whole and so the entire wall 14 of the storage pipe 12 serves to introduce heat and carry heat away. To this end, a heat exchanger 24 enclosing the storage pipe 12 is, for example, provided. This is, for example, designed as a sleeve 25 with channels 23 for a heat carrier medium enclosing the storage pipe 12. Such storage pipes 12 can just as well be installed in heat pipes, whereby isothermal conditions are achieved on the entire outside wall of the storage pipes 12 as a special advantage.

As shown in FIG. 2, the wall 14 borders with a wall surface 26 on the interior space 16, and the wall surface 26 comprises a section which forms a cylinder wall surface 28 of the cylindrical subspace 18 and a section which forms a groove wall surface 30 of the longitudinal grooves 22.

In accordance with the invention, the wall surface is made of a material which is not wettable by the storage medium, i.e., by the alkali halides or alkaline-earth halides. This is preferably graphite or carbon fibers.

The wall 14, for its part, may likewise comprise graphite or carbon fibers. It is, however, preferable for ceramic fibers 32 to be embedded therein for reinforcement and, in addition, metal particles 34 for improving the heat conductivity. In any case, the wall 14 is constructed such that in the wall surface 26 facing the interior space 16, the wall 14 comprises only graphite or carbon fibers and contains neither the embedded metal particles 34 nor the ceramic fibers 32.

In order to prevent the storage medium, i.e., the alkali halides and akaline-earth halides or their eutectics from penetrating the grooves 22 in the completely liquid state without additional force acting thereon, the facing groove wall surfaces 30 are spaced from one another by an amount which is less than approximately 6 mm, preferably 2 mm. As a result of such spacing of the groove wall surfaces 30, the storage medium does not penetrate into the longitudinal grooves 22 owing to its surface tension and the fact that it does not wet the wall surfaces 26.

Therefore, the storage pipe 12 is preferably filled to such an extent that the storage medium 36 fills out the cylindrical subspace 18 in the completely liquid state, but does not penetrate into the longitudinal grooves 22 to any substantial degree.

Such a filled state is shown in FIG. 3, in accordance with which the storage medium exhibits in each longitudinal groove 22 a surface 38 of meniscus-shaped cross-section which is formed between the groove wall surfaces 30 in the region of the transition between the groove wall surfaces 30 and the cylinder wall surfaces 28. In the ideal case, the storage medium 36 extends to a slight extent into the longitudinal grooves 22 in order to establish as good thermal contact as possible between the storage medium 36 and the storage pipe 12, in particular its wall 14. To this end, it is particularly expedient for the edges of the adjoining surfaces 28, 30 to be rounded.

The facing wall surfaces 26 are preferably oriented such that they extend transversely to the surface 38 and thereby promote optimal formation of the surface tension in the region of the surface 38 which prevents the storage medium 36 from penetrating into the longitudinal grooves 22.

In a second embodiment of the inventive heat exchanger, illustrated in FIG. 4, not longitudinal grooves 22 but transverse grooves 40 are provided in the storage pipe 12. These are arranged either alongside one another in the radial direction only or so as to form a spiral extending in the radial direction.

In a third embodiment of the inventive heat accumulator, the storage container is made up of plate-shaped hollow bodies 42 comprising an interior space 50 closed off by a bottom wall 44 and a top wall 46 and by an outside wall 48 extending around in the circumferential direction and joining both of these in their edge region. This interior space 50 comprises a rectangular plate-shaped subspace 52 with recesses 54, preferably in the form of single or coherent grooves extending to essentially the same extent as the bottom wall 44 or the top wall 46 from the subspace 52 into the bottom wall 44 or into the top wall 46.

The bottom wall 44, the top wall 46 and the outside wall 48 are, in principle, of exactly the same construction as the wall 14, i.e., the wall itself may comprise ceramic fibers 32 for reinforcement and metal particles 34 for improvement of the heat conduction and, in addition, graphite fibers or carbon fibers, and the wall surfaces 56 facing the interior space 50 comprise either graphite fibers or carbon fibers which are not wettable by the storage medium.

The spacings of facing wall surfaces 58 of the recesses are likewise chosen such that the storage medium 36 does not penetrate into these in the completely liquid state, i.e., they similarly have a spacing of preferably less than 6 mm.

The plate-shaped hollow bodies 42 are preferably stacked on top of one another to form a heat accumulator, thereby creating spaces 60 through which a liquid or gaseous heat exchanger medium may flow. Alternatively, it is, however, likewise possible for the bottom wall 44 and the top wall 46 to be provided with channels for the heat exchanger medium.

In a fourth embodiment, illustrated in FIG. 6 and representing a variant of the third embodiment, insofar as the same parts are used, these also bear the same reference numerals. Differently from the first embodiment, the recesses 54' are not grooves, but a honeycomb-type structure with facing wall surfaces 58' of the recesses 54' preferably forming the wall surfaces of a hexagonal hollow cylinder extending from the subspace 52 into the bottom wall 44 and into the top wall 46. This design of the recesses has the advantage that a greater stability of the bottom wall 44 and the top wall 46 is achievable.

In a fifth embodiment of the inventive heat accumulator, illustrated in FIG. 7, the storage container is likewise designed as storage pipe 62, the wall 64 of which carries on its side facing a cylindrical interior space 66 a non-woven carbon fabric or a woven fabric made of carbon fibers 68, i.e., material containing carbon fibers which, for its part, contains spaces between the carbon fibers which serve as recesses within the meaning of the invention and are likewise so small that a storage medium 70 arranged in the cylindrical interior space does not penetrate into the non-woven carbon fabric or the woven fabric 68 owing to the surface tension and without the effect of additional forces, since the facing wall surfaces of the carbon fibers exhibit a spacing which is less than 6 mm.

The wall 64, for its part, may comprise ceramic fibers 32 for reinforcement and metal particles 34 for improvement of the heat conduction. It must, however, be of such construction that its inside surface 72 facing the non-woven carbon fabric or woven fabric 68 is made of graphite or carbon only.

In a sixth embodiment representing a modification of the fifth embodiment, the same parts bear the same reference numerals insofar as these are identical with those of the fifth embodiment. Instead of the non-woven carbon fabric or woven fabric 68, however, there is arranged between the cylindrical interior space 66 and the wall 64 carbon foamed material 74 which is open-pored and hence comprises pores likewise facing the cylindrical interior space 66 as recesses, the facing wall surfaces of which have a spacing of less than 6 mm so the storage medium 70 cannot penetrate into these in the completely liquid state without the action of additional forces.

In a preferred variant of the sixth embodiment, its outside surfaces 76 are coated with a protective layer 78 of metal and/or ceramics in order to make these resistant to environmental influences and/or gas-tight.

The inventive heat accumulator functions as follows:

The properties of the alkali halides or alkaline-earth halides or their eutectics provided as storage medium are such that during the transition from the solid state to the molten, a change in volume of the order of magnitude of 20 to 30% occurs.

Owing to the fact that the storage medium in the completely liquid state, i.e., in the heated state, does not penetrate into the longitudinal grooves 22 or the recesses 54, the interstices of the non-woven carbon fabric or woven fabric 68 or the pores of the carbon foamed material 74, the storage medium in the solidified, i.e., cooled-down state has also not penetrated into the longitudinal grooves 22, the recesses 54, the interstices of the non-woven carbon fabric or woven fabric 68 or the pores of the foamed carbon material 74. On account of its smaller volume, the solidified storage medium has one or several contraction cavities in its interior. When the heat is then introduced into the storage container, the storage medium first starts to melt on its surface facing the storage container, and the molten volume portions expand in the aforesaid order of magnitude but owing to the firm storage medium which is still present to a considerable extent, are prevented traction cavities, in the entire available interior space with the exception of the longitudinal grooves 22, the recesses 54, the interstices of the non-woven carbon fabric or woven fabric 68 or the pores of the foamed carbon material. In this state, the longitudinal grooves 22, the recesses 54, the interstices of the non-woven carbon fabric or woven fabric 68 or the pores of the foamed carbon material 74 come into effect, as the liquid storage medium under pressure can now penetrate into these recesses against the effective capillary forces and hence has the possibility of expanding accordingly until the entire storage medium has melted, to then be forced back uniformly again by the capillary forces into the interior space provided for it with the exception of the longitudinal grooves 22, the recesses 54, the interstices of the non-woven carbon fabric or woven fabric 68 or the pores of the foamed carbon material 74.

We claim:

1. Heat accumulator comprising a storage container with a wall region provided for the introduction of heat and a storage medium arranged in this storage container, wherein said wall region is provided with recesses which are open towards said storage medium, a wall surface of said wall region facing said storage medium is made of a material which is not wettable by said storage medium, and facing wall surfaces in said recesses exhibit such a spacing from one another that said storage medium does not penetrate into these to any substantial degree in the completely liquid state owing to the capillary forces.

2. Heat accumulator as defined in claim 1, characterized in that said facing wall surfaces of said recesses extend substantially transversely to a surface of said storage medium extending between said wall surfaces.

3. Heat accumulator as defined in claim 1, characterized in that said recesses exhibit in at least one direction a spacing of said wall surfaces which is less than approximately 6 mm.

4. Heat accumulator as defined in claim 3, characterized in that said recesses exhibit in at least one direction a spacing of said wall surfaces which is less than approximately 4 mm.

5. Heat accumulator as defined in claim 4, characterized in that said recesses exhibit in at least one direction a spacing of said wall surfaces which is less than approximately 2 mm.

6. Heat accumulator as defined in claim 5, characterized in that said recesses exhibit in at least one direction a spacing of said wall surfaces which is less than approximately 1 mm.

7. Heat accumulator as defined in claim 1, characterized in that said wall surfaces comprise graphite.

8. Heat accumulator as defined in claim 7, characterized in that said wall surfaces are made of graphite.

9. Heat accumulator as defined in claim 1, characterized in that metals are embedded in a wall of said storage container carrying said wall surface.

10. Heat accumulator as defined in claim 1, characterized in that ceramic fibers are embedded in a wall of said storage container carrying said wall surface.

11. Heat accumulator as defined in claim 1, characterized in that a wall of said storage container carrying said wall surface comprises graphite.

12. Heat accumulator as defined in claim 1, characterized in that said wall surfaces comprise carbon fibers.

13. Heat accumulator as defined in claim 12, characterized in that said wall surfaces are made of carbon fibers.

14. Heat accumulator as defined in claim 1, characterized in that a wall of said storage container carrying said wall surface comprises carbon fibers.

15. Heat accumulator as defined in claim 1, characterized in that an interior space of said storage container is substantially filled with the exception of said recesses with storage medium in the completely liquid state.

16. Heat accumulator as defined in claim 15, characterized in that said interior space of said storage container is filled to such an extent that said storage medium penetrates slightly into said recesses in the completely liquid state.

17. Heat accumulator as defined in claim 1, characterized in that said wall region comprises grooves.

18. Heat accumulator as defined in claim 1, characterized in that said wall region comprises non-coherent depressions arranged along-side one another.

19. Heat accumulator as defined in claim 1, characterized in that said wall region is provided with porous material which is not wettable by said storage medium.

20. Heat accumulator as defined in claim 19, characterized in that said porous material is non-woven carbon fabric.

21. Heat accumulator as defined in claim 19 characterized in that said porous material is a woven fabric or knitted fabric.

22. Heat accumulator as defined in claim 19, characterized in that said porous material is open-pored, foamed material which is not wettable by said storage medium.

23. Heat accumulator as defined in claim 22, characterized in that said foamed material is graphite foam.

24. Heat accumulator as defined in claim 1, characterized in that edges of said recesses facing said storage medium are rounded off.

25. Heat accumulator as defined in claim 1, characterized in that outside surfaces thereof are coated with one or several protective layers of metal and/or ceramics.

* * * * *